US008516914B2

(12) United States Patent
Osterlänger et al.

(10) Patent No.: US 8,516,914 B2
(45) Date of Patent: Aug. 27, 2013

(54) SUSPENSION ACTUATOR

(75) Inventors: Jürgen Osterlänger, Emskirchen (DE);
Ralf Mayer, Herzogenaurach (DE);
Manfred Kraus, Herzogenaurach (DE);
Thomas Mehlis, Kleinsendelbach (DE);
Stefanie Bärthlein, Baudenbach (DE);
Meinhard Schmidt, Kammerstein (DE);
Thomas Dirnberger, Obermichelbach
(DE); Tobias Noss, Osnabrück (DE);
Falk Heinrich, Hoyerswerda (DE)

(73) Assignee: Schaeffler Technologies AG & Co. KG,
Herzogenaurach (DE)

( * ) Notice: Subject to any disclaimer, the term of this patent is extended or adjusted under 35 U.S.C. 154(b) by 292 days.

(21) Appl. No.: 12/990,698

(22) PCT Filed: Apr. 27, 2009

(86) PCT No.: PCT/EP2009/055055
§ 371 (c)(1),
(2), (4) Date: Jan. 3, 2011

(87) PCT Pub. No.: WO2009/133064
PCT Pub. Date: Nov. 5, 2009

(65) Prior Publication Data
US 2011/0107859 A1    May 12, 2011

(30) Foreign Application Priority Data
May 2, 2008   (DE) .......................... 10 2008 021 861

(51) Int. Cl.
*F16H 25/20* (2006.01)
*F16D 49/04* (2006.01)

(52) U.S. Cl.
USPC .............. 74/89.39; 74/38; 280/5.5; 280/5.52; 188/266; 188/129

(58) Field of Classification Search
USPC ................. 74/89, 89.23, 89.37, 89.38, 89.39; 280/86.757, 93.502, 93.51, 93.513, 124.134, 280/5.5, 5.52, 5.501, 5.514; 188/266, 266.5, 188/129, 134
See application file for complete search history.

(56) References Cited

U.S. PATENT DOCUMENTS 3,110,380 A * 11/1963 Meyer et al. ................ 192/223.4
3,111,822 A * 11/1963 Hansen ............................ 464/40
(Continued)

FOREIGN PATENT DOCUMENTS
DE       10144111      3/2003
DE     102005023250    11/2006
(Continued)

*Primary Examiner* — Troy Chambers
*Assistant Examiner* — Valentin Craciun
(74) *Attorney, Agent, or Firm* — Volpe and Koenig, P.C.

(57) ABSTRACT

A suspension actuator (1) for positioning a movably mounted component of a motor vehicle suspension, including a first actuator component (4), which is to be connected to the movably mounted component, and a second actuator component (3), which is to be connected to a fixed suspension component, wherein both actuator components can be axially adjusted relative to one another via a ball-type linear drive (5), which includes a threaded spindle (6) and a nut (7) running thereon. Either the nut can be driven via a drive motor (10) for the axial adjustment of the threaded spindle or the spindle can be driven via a drive motor for axial adjustment of the nut. A brake unit (14, 28), which can be actuated by an external force on the suspension side and acts on the nut (7) or the spindle and rotates them, and which builds up a friction torque opposing a nut rotation or the spindle rotation, which acts between the nut (7) or the spindle (6) and a fixed actuator element (22, 35) or between a drive shaft of the drive motor (10) and a fixed actuator element (45) associated therewith, is provided.

6 Claims, 8 Drawing Sheets

(56) References Cited

U.S. PATENT DOCUMENTS

| | | | |
|---|---|---|---|
| 3,757,472 A * | 9/1973 | Rogakos | 49/40 |
| 3,930,566 A * | 1/1976 | Matsushima | 192/223.4 |
| 4,246,991 A * | 1/1981 | Oldakowski | 192/223.4 |
| 4,250,762 A * | 2/1981 | Weatherby | 74/89.38 |
| 4,267,909 A * | 5/1981 | Herold | 192/223.4 |
| 4,499,787 A * | 2/1985 | Leistner et al. | 74/625 |
| 4,623,051 A * | 11/1986 | Lochmoeller | 192/223.4 |
| 4,646,888 A * | 3/1987 | Higuchi et al. | 192/223.4 |
| 4,651,854 A * | 3/1987 | Harada | 192/223.4 |
| 5,046,376 A * | 9/1991 | Baker | 74/89.39 |
| 5,058,445 A * | 10/1991 | Nilsson | 74/89.4 |
| 5,083,626 A * | 1/1992 | Abe et al. | 180/445 |
| 5,328,007 A * | 7/1994 | Yokozuka et al. | 192/223.4 |
| 6,158,295 A * | 12/2000 | Nielsen | 74/89.38 |
| 6,798,102 B2 * | 9/2004 | Adachi | 310/78 |
| 6,927,513 B2 * | 8/2005 | Schreier | 310/75 D |
| 7,191,886 B2 * | 3/2007 | Fluckiger et al. | 192/223.4 |
| 8,091,444 B2 * | 1/2012 | Tseng | 74/89.39 |
| 8,186,236 B2 * | 5/2012 | Lorenzen | 74/89.38 |
| 8,234,944 B2 * | 8/2012 | Lorenzen | 74/89.38 |
| 2009/0044646 A1 * | 2/2009 | Duck et al. | 74/89.39 |

FOREIGN PATENT DOCUMENTS

| | | |
|---|---|---|
| EP | 0258571 | 3/1988 |
| EP | 1186800 | 3/2002 |
| JP | 2008303963 | 12/2008 |

* cited by examiner

SUSPENSION ACTUATOR

BACKGROUND

The invention relates to a suspension actuator for positioning a movably mounted component of a vehicle suspension, with the actuator comprising a first actuator component for connecting to the movably mounted component and a second actuator component for connecting to a fixed suspension component, wherein both actuator components can be adjusted relative to each other in the axial direction by a ball-type screw drive comprising a threaded spindle and a nut running on this spindle, wherein either the nut can be driven by a drive motor for the axial adjustment of the threaded spindle or the spindle can be driven by the drive motor for the axial adjustment of the nut.

Such a suspension actuator is used in suspensions of vehicles, for example, on a wheel suspension of a vehicle wheel. By use of the suspension actuator that can be driven independently, a desired adjustment of the suspension-side, movably mounted component, such as, for example, of a wheel carrier or the like, is possible. A suspension actuator suitable for this purpose, as is known, for example, from DE 10 2005 023 250 A1, has available two actuator components, wherein a first actuator component is connected to the suspension component to be adjusted and a second actuator component is connected to a fixed suspension component, thus it is supported there on the vehicle body. Both actuator components could be adjusted relative to each other in the axial direction, with a ball-type screw drive being used for this purpose. This drive comprises a threaded spindle by which both actuator components are connected, as well as a nut running on this spindle, with the nut running on the spindle via balls located in-between. For the axial adjustment of the spindle and thus for moving the actuator components away from or toward each other for the desired suspension adjustment, a drive motor is used that rotates the fixed nut, which leads to the axial movement of the spindle relative to the fixed nut. A different construction provides a fixed spindle rotationally driven by the drive motor, while the nut that is connected to the suspension part for positioning is moved axially. Such suspension actuators—typically an independent suspension actuator that can be driven separately is allocated to each wheel—take over safety-relevant tasks, which is why, in principle, there is the requirement that the linked suspension components do not carry out undesired positioning movements, for example, when there is the loss of an actuator, but instead are held in the last set position. Likewise it must be guaranteed that external forces that are introduced in the reverse direction into the actuator via the suspension are absorbed reliably, without the actuator carrying out undesired positioning movements due to these external forces.

For this purpose, in the suspension actuator according to DE 10 2005 023 250 A1, a locking mechanism in the form of a mechanical ramp catch is provided that has a switchable construction. This locking mechanism blocks the driven part, that is, the nut, when the driving force of the actuator is less than an external force acting on the nut, wherein this force is applied either by the drive motor or is 0 for an adjustment that has not yet been performed. For example, if the suspension actuator described there is used for active adjustment of the wheel camber of a wheel of a motor vehicle, for example, shocks introduced into the wheel from the outside are forwarded only up to the driven part, that is, the nut of the actuator. An introduction of these shock forces into the actuator up to the motor is ruled out, because the driven part, that is, the nut, is blocked by the locking mechanism. The shock forces are introduced into the fixed suspension itself by the locking mechanism. The locking mechanism itself is constructed in the known suspension actuator as a clamping-roller locking mechanism and comprises a clamping ring provided with clamping ramps and a hollow-cylindrical part with a cylindrical clamping track that forms, together with the clamping ramp part, the clamping gap in which the clamping rollers are arranged that can be switched into and out of clamping engagement with the clamping ramps. The clamping rollers themselves are constantly ready for clamping, for which purpose they are biased with springs.

Such a clamping-roller locking mechanism could indeed realize the desired actuator locking that satisfies the requirements named above. However, such clamping locking with clamping ramps knows, in principle, only two positions, namely the locked position or the unlocked position. From this situation, problems can result when the spindle is to be adjusted in the loading direction, i.e., an external force is applied that acts in the positioning direction. This leads to so-called "locking jerking movements." These are generated because the load constantly overtakes the drive, i.e., the clamping rollers are constantly brought into the clamping position by the external load. When the drive motor has somewhat "caught up" to the load again, the motor opens the clamping locking mechanism again, whereupon the load overtakes the drive again, resulting again in the locking of the locking mechanism, and so on. This, however, is disadvantageous or not permissible in many applications.

SUMMARY

Thus, the objective forming the basis of the invention is to provide a suspension actuator that avoids the occurrence of locking jerking movements and allows a jerking-movement-free positioning also for an externally applied load.

For meeting this objective, in the suspension actuator of the type noted above it is provided according to the invention that a brake unit is provided that can be activated by an external, suspension-side force acting on the nut or the spindle and rotating these parts, wherein this brake unit builds up a friction moment acting against a nut rotation or a spindle rotation and acting between the nut or the spindle and a fixed actuator element or between a drive shaft of the drive motor and a fixed actuator element allocated to this motor.

By use of the brake unit provided according to the invention, it is possible to build up a friction moment that is dependent on the degree of loading of the brake unit, that is, on the magnitude of the external, suspension-side force, wherein this moment counteracts a nut rotation or the spindle rotation—according to which element is loaded with the external force and would adjust itself undesirably. Finally, this friction moment could be so large that the brake unit is completely blocked, consequently it acts as a locking unit. By use of this variable friction moment, it is possible to also realize a jerking-movement-free positioning movement for an adjustment in the direction of an external load, after which a braking effect is indeed achieved by the building friction moment, but despite all of this, finally a braked positioning movement is possible. True locking is used only when the drive motor itself is not activated, consequently no positioning movement is to be performed. The brake unit then builds up to such a high friction moment that a nut rotation or a spindle rotation is completely prevented. For the case that a positioning movement is to be performed and an external force is being applied, the brake unit generates a counteracting friction moment that is, however, somewhat "over-rotated" by the positioning drive motor that actively rotates the nut or the spindle according to the embodiment itself, so that it results merely in a braked nut rotation that is, however, not completely blocked.

Thus, with such an integrated brake unit that is somewhat variable with respect to the "braking force," the locking jerking movements that occur in actuators of the prior art using clamping-roller locking are advantageously avoided, so that such a suspension actuator according to the invention is suitable especially for safety-related positioning tasks as given in the field of suspensions, in particular, in the field of wheel adjustment with respect to wheel steering.

Here it is conceivable to integrate the brake unit directly in the area of the nut or spindle, that is, to arrange it somewhat axially. Alternatively, however, the brake unit could also be provided in the area of the drive motor that is provided offset to this unit and that is connected to the nut or the spindle, e.g., by a belt or a gear mechanism, where it acts on the connection of the motor driven shaft for the belt or gear mechanism operation.

The brake unit itself advantageously comprises a helical wrap-spring that wraps around the fixed, cylindrical actuator element for building up the friction moment and that is coupled with the drive motor for loosening the spring wrap and to the nut or the spindle for closing the spring wrap. Here it involves a coil-spring locking mechanism under the use of a helical wrap-spring or a coil band that interacts with the fixed, cylindrical actuator element, for example, in the form of a sleeve or a housing component.

For activating the helical wrap-spring, an opening element and a closing element are provided, wherein the opening element can be rotated by the drive motor and attaches to one of the two angled spring ends of the helical wrap-spring according to the rotational direction of the drive motor or the opening element. In this way, the helical wrap-spring is opened, i.e., it is detached from its friction contact on the fixed, cylindrical actuator element, so that a low-friction-moment rotation of the nut or the spindle is possible. For closing, a closing element is provided that is locked in rotation with the nut or the spindle and that likewise attaches to one of the two angled spring ends by the action of an external force leading to a nut or spindle rotation; the helical wrap-spring, however, either contracts or expands according to the functional principle, so that it results in friction contact on the actuator element and thus to the generation of friction or brake moment. Both the opening element and also the helical wrap-spring, just like also the closing element, are arranged on the side of the nut, that is, rotate in the regular positioning operation, driven by the drive motor, with the nut or the spindle. The rotationally locked connection could be realized somewhat directly with an axial configuration; alternatively, an indirect, rotationally fixed connection between the nut/spindle and the motor-side brake unit by the belt or the gear mechanism is also possible.

The opening element and closing element each have two advantageously circular-arc-shaped catches that are offset opposite each other by 180°, wherein the catches of both elements engage with each other with a slight peripheral distance, wherein the two spring elements are each positioned between two catches. The opening and the closing elements are thus rotated about the longitudinal axis of the spindle, so that the corresponding catches likewise rotate and are moved, according to the rotational direction, against one end or the other of the spring element, which results in that the helical wrap-spring is either opened or closed, but in each case it is deformed. The configuration with engaging catches is useful with respect to a compact form of the brake unit (that could also be addressed as a combination brake and locking unit). The spring ends themselves advantageously project inward in the radial direction, thus are angled inward in the radial direction, which allows the gear mechanism of a higher force via the catches than for an outwardly angled section. It remains to be said, however, that obviously a construction with outwardly angled spring elements and correspondingly formed opening and closing elements is also conceivable with respect to correspondingly positioned catches.

The fixed actuator element itself is preferably wrapped around its outer face, i.e., such that the helical wrap-spring is pulled tight for locking, consequently is reduced in its inner diameter, so that the helical wrap-spring forms a planar and friction contact with its inner side on the outer side of the actuator element that is constructed as a sleeve or the like. For opening, the helical wrap-spring is expanded, that is, bent open. Here, it is naturally also conceivable to realize a kinematically inverted construction in which the fixed actuator element, for example, as a cylindrical housing component, interacts with its cylindrical inner wall with the helical wrap-spring that is then expanded for generating the braking moment, that is, for closing, so that its outer diameter increases and the spring outer side forms a contact on the element inner side. For opening, that is, for releasing the friction-fit connection, the spring is then contracted, that is, reduced in diameter again.

The drive motor is preferably arranged laterally on a housing of the suspension actuator and coupled with the nut or the spindle by a traction mechanism, in particular, a belt, or a gear mechanism. Through the use of this belt or the gear mechanism, the drive motor, in principle, an electric motor, can actively drive the nut or the spindle for the desired positioning movement. Alternatively, however, it is also conceivable to arrange the drive motor axially if the configuration of the suspension actuator allows this with respect to the existing suspension-side space for installation.

BRIEF DESCRIPTION OF THE DRAWING

An embodiment of the invention is shown in the drawings and is described in more detail below. Shown are.

DETAILED DESCRIPTION OF THE PREFERRED EMBODIMENTS

Figure 1:
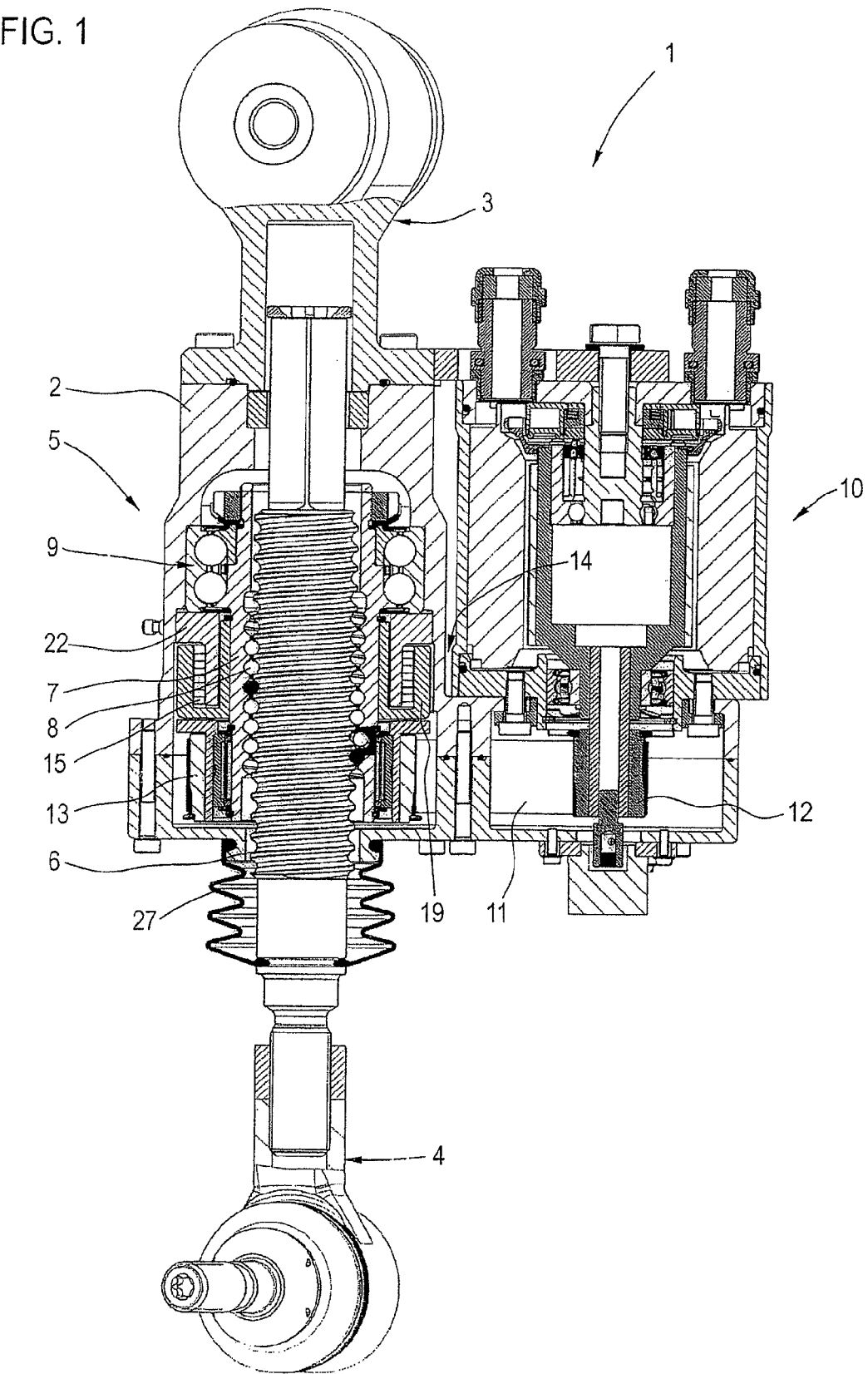
FIG. 1 a block diagram of a suspension actuator according to the invention in cross-section, FIG. 2 a perspective view of the brake unit with helical wrap-spring, FIG. 3 a cross-sectional view through the brake unit from FIG. 2, FIG. 4 a longitudinal section view through the brake unit from FIG. 2, FIG. 5 a block diagram, partially in section, of an assembled example of a suspension actuator, FIG. 6 an exploded view of another embodiment of a brake unit, FIG. 7 a cross-sectional view through the assembled brake unit from FIG. 6, FIG. 8 a longitudinal section view through the brake unit, FIG. 9 a block diagram of a second embodiment of a suspension actuator according to the invention in cross-section, FIG. 10 the suspension actuator from FIG. 9 in another operating position, FIG. 11 an exploded view of another embodiment of a brake unit, and FIG. 12 a section view through the assembled brake unit from FIG. 11.

FIG. 1 shows a suspension actuator 1 according to the invention, comprising a housing 2 with a first actuator component 3, as well as a second actuator component 4 moving axially relative to the first actuator component 3. The first actuator component 3 is to be connected, in the scope of the assembly, to a fixed suspension component, for example, a suspension carrier or the like, while the second actuator component 4 is to be connected to a moving suspension component, for example, a part of the wheel suspension for positioning the wheel camber or the like. For this purpose, in a known way, corresponding fastening elements are provided with respect to bearing receptacles.

For the axial adjustment of the two actuator components 3, 4 relative to each other, a ball-type screw drive 5 is provided, comprising a threaded spindle 6 that is part of the second actuator component 4 or is connected to this component. A threaded nut 7 is guided over a plurality of balls 8 and runs on the threaded spindle 6 which is sealed outward by an expansion bellows 27 and extends into the interior of the housing 2. The threaded nut 7 is rotationally mounted by a bearing 9 so that it can rotate, but is fixed in the housing 2. For the axial adjustment of the threaded spindle 6 that is moved in this way into the housing 2 or out from this housing is a drive motor 10 not described in more detail here, for example, a simple, small electric motor that is coupled with the nut 7 by toothed belt 11 shown only partially here. For this purpose, on the electric motor 10 there is a belt pulley 12 over which the belt 11 runs and the nut 7 likewise has a belt pulley 13 over which the belt 11 runs. This belt pulley 13 is connected to a brake unit still to be described below with respect to the part itself. According to the direction in which the electric motor 10 rotates, the nut 7 rotates on the threaded spindle 6 that is here moved either into the housing 2 or out from the housing 2, so that the axial position of the two actuator components 3, 4 changes relative to each other.

In order to avoid locking jerking movements for an axial adjustment of the actuator component 4 in the direction of a load acting on this actuator component 4, in the illustrated example, a brake unit 14 is provided that can be activated as a function of the suspension-side force acting externally and is built up by the friction moment that counteracts the nut rotation and acts between the nut 7 and a fixed actuator element. In this way, a friction-damped axial movement can be realized somewhat, wherein the friction moment is suppressed by the electric motor 10 for a desired adjustment in the direction of the acting external load. For an undesired positioning movement, that is, when the electric motor 10 is stationary, the friction moment is so large that it results in a complete locking and consequently the nut 7 is moved by the external force only by a small, possible rotational angle until the complete locking of the brake unit and any further movement is then blocked.

Figure 2:
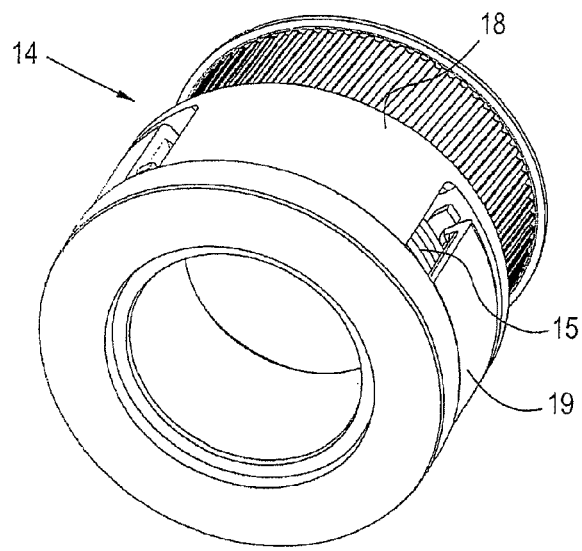
Figure 3:
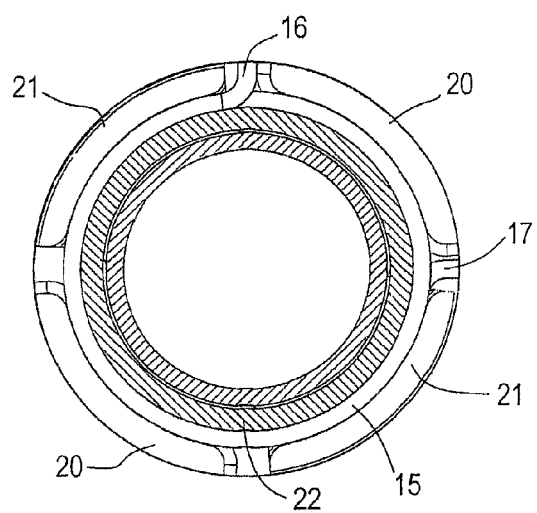
Figure 4:
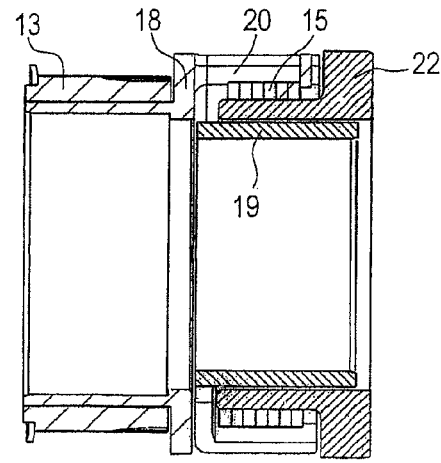

The brake unit 14 is shown in detail in FIGS. 2-4. It involves a coil-spring brake comprising a helical wrap-spring 15 whose two ends 16, 17 are angled and project outward in the radial direction in the illustrated embodiment. The helical wrap-spring 15 is held between an opening element 18 and a closing element 19; the two elements each have two catches 20 on the opening element 18 and 21 on the closing element 19, respectively, which have a circular-arc-shaped construction and engage one in the other, see FIG. 3. The two spring ends 16, 17 each lie between a catch 20 and a catch 21. The opening element 18 and the closing element 19 can move separately relative to each other. The opening element 18 has the belt pulley 13 by which the nut 7 is rotated by the electric motor 10. The closing element 19 is rotated by the externally applied load, if one is given.

The brake unit 14 further comprises a stationary ring that forms the stationary actuator element 22 that is connected fixed to the bearing housing 2. This ring is cylindrical and is wrapped around on the outside by the cylindrical helical wrap-spring 15.

During operation, should the second actuator component 4 be moved axially, then the motor 10 actively drives the nut via the belt 11. For this purpose, initially the opening element 18 is rotated, which has the result that the catch 20 located between the two spring ends 16, 17 runs according to the rotational direction either against the spring end 16 or the spring end 17. This has the result that the helical wrap-spring 15 is expanded, that is, its inner diameter is increased, so that it definitely does not contact the outer face of the actuator element 22, consequently, no friction moment is also built up there. After rotation by a defined angle increment, the torque is transferred completely to the nut 7, so that this is rotated and it results in an axial displacement of the threaded spindle 6. The opposite catch 20 is likewise rotated, but it has no opening function, it is merely provided for reasons of weight symmetry.

If an external load acts on the suspension actuator 1—assuming the electric motor 10 is not in operation—then this load has the effect that the nut 7 is driven by the loaded threaded spindle 6, leading to an axial displacement of the threaded spindle 6 relative to the fixed nut 7 in the loading direction. This is prevented, however, by the integrated brake unit 14 according to the invention. If an external load acts on the brake unit 14, then this has the result that, for an unmoved opening element 18, the closing element 19 connected to the nut 7 is moved. According to in which direction this rotation takes place, one of the catches 21 engages either on the spring end 16 or on the spring end 17, which has the result that, when the rotational movement continues, the helical wrap-spring 15 is tightened, consequently the inner diameter is reduced and it forms a friction-fit connection with its inner side on the outer side of the stationary actuator element 22. When a defined rotational angle is reached, the friction moment is so large that further nut movement is completely stopped. This rotational angle equals only a few degrees, so that a significant undesired positioning movement in the axial direction is immediately prevented.

For an active axial adjustment, that is, when the electric motor 10 is actively driving the nut 7, such an external load is applied, so this results in the electric motor 10 continuously opening the opening element 18, that is, expands the helical wrap-spring 15. The external force counteracts this in that the nut rotates by this force likewise actively in the same direction as driven by the electric motor 10. This has the result that the catches 21 of the closing element 19 retract the helical wrap-spring 15 again, consequently build up a friction moment. Due to the active rotation by the electric motor 10, however, this leads to no jerking movement, but instead only a certain friction moment is built up continuously by the closing element 19, wherein, however, this friction moment is "over-rotated" by the active electric-motor rotation. This friction moment has merely a damping, but not blocking effect, so that a jerking movement is not applied. That is, it results in a braked or damped axial positioning movement, that is, a braked lowering or raising under a rectified load.

The friction moment that can be achieved is adjustable, on one hand, by a corresponding adaptation of the diameter of the helical wrap-spring 15, on the other hand by a suitable selection of materials. Finally it should be very low, because it is to be overcome by the motor 10.

Figure 5:
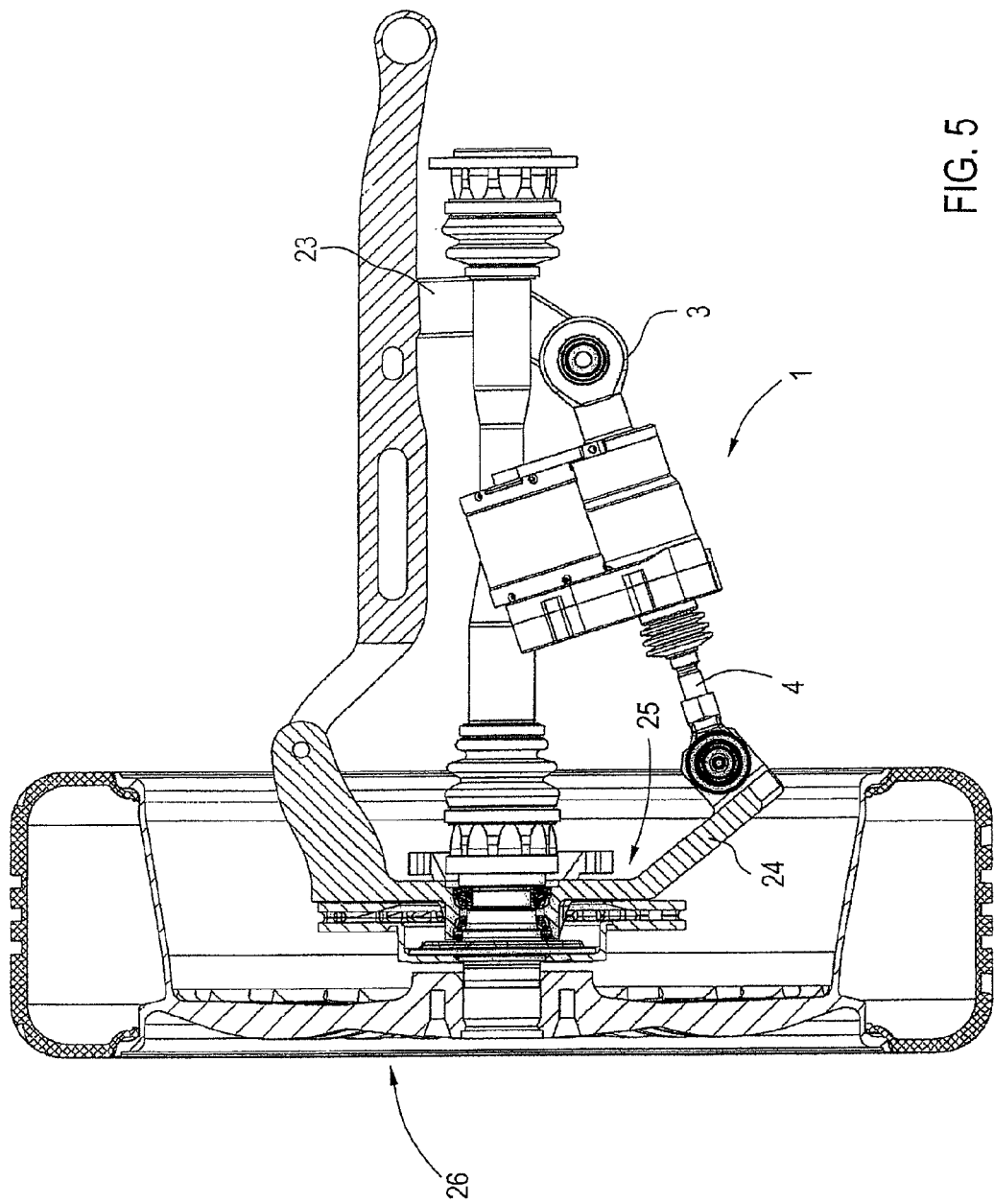

FIG. 5 shows an assembled example of a suspension actuator 1 according to the invention that is connected by the first actuator component to a stationary suspension component 23, while the second actuator component 4 is connected to a moving suspension component 24, here a part of the wheel bearing 25. For an axial movement of the second actuator component 4, the wheel bearing 25 could be pivoted and thus the wheel camber of the wheel 26 could be adjusted. However, this is only one example for a possible application of the suspension actuator; other possible applications on the side of the suspension are also conceivable for carrying out positioning movements of a moving suspension component relative to a fixed suspension component.

Figure 6:
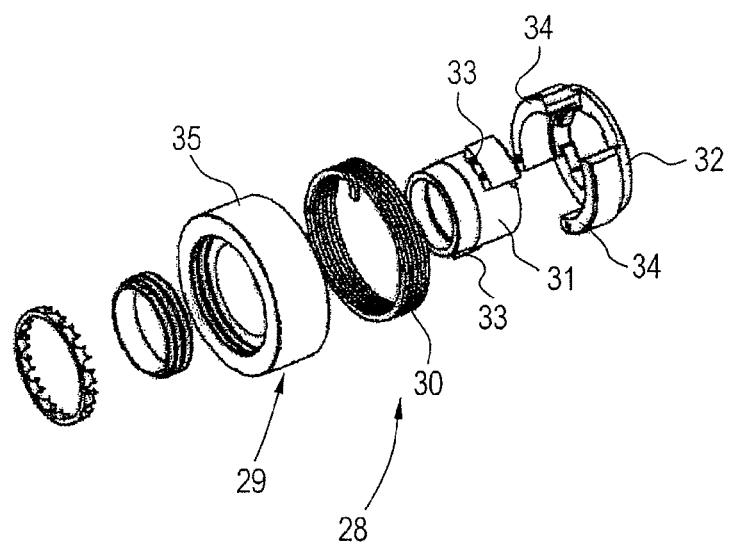
Figure 7:
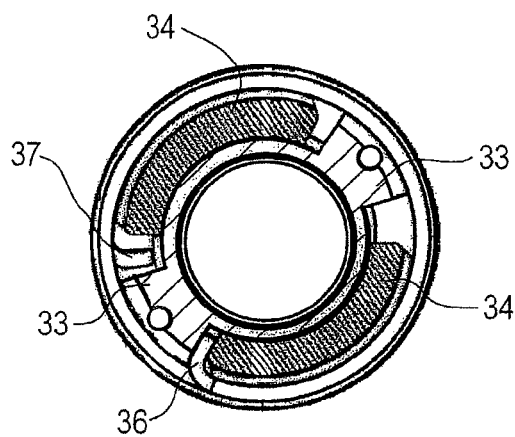
Figure 8:
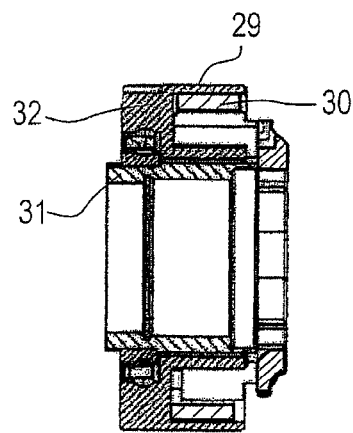

FIGS. 6-8 show another embodiment of a brake unit 28 that could be used in a suspension actuator as shown in FIG. 1 or that could be integrated in this actuator. This unit comprises a housing 29 in which a helical wrap-spring 30 as well as a closing element 31 and an opening element 32 are held. The closing element 31 here also has two catches 33, while the opening element 32 shows two catches 34. Both catch pairs lie opposite each other; in the assembled position they also engage in each other, cf. FIG. 7. The spring ends 36 and 37 of the helical wrap-spring 30 are here bent inward and are also held between a catch 33 and a catch 34. The housing 29 here forms the stationary actuator element 35 against whose inner face the helical wrap-spring contacts for generating the brake moment. In the assembled state, here the closing element 31 is also connected to the nut 7 (cf. FIG. 1), while the opening element 32 is connected to the electric motor 10 (cf. FIG. 1) by a belt or the like. For carrying out the positioning movement, the electric motor 10 also rotates the opening element 32 that runs with its catch 34 against one of the spring ends 36, 37 and contracts the helical wrap-spring 30 for further rotation, so that its outer diameter is reduced. Thus, the helical wrap-spring 30 is not in friction-fit connection with the cylindrical inner face of the housing 29, so that the positioning movement can be carried out without friction.

If an external load is applied, then this rotates the nut 7, by which the closing element 31 connected to the nut 7 is rotated. One of its catches 33 engages on one of the spring ends 36, 37, which has the result that the helical wrap-spring 30 is bent and it forms a friction contact with its outer side on the inner face of the housing 29. This leads to the build-up of a braking moment that is so large when the electric motor 10 is turned off that the rotation of the nut 7 is completed blocked and there is no undesired positioning movement.

When a load is applied, if the electric motor is operating for a positioning movement performed in the load direction, then it here results in a simultaneous build-up of a friction moment damping the positioning movement and dependent in its height on the height of the external force, but the positioning movement is always possible due to the motor drive "overforcing" the braking effect. Also, this does not result in locking jerking movements. The construction of the brake unit shown here is advantageous to the extent that the spring ends directed inward allow the introduction of higher forces.

Figure 9:
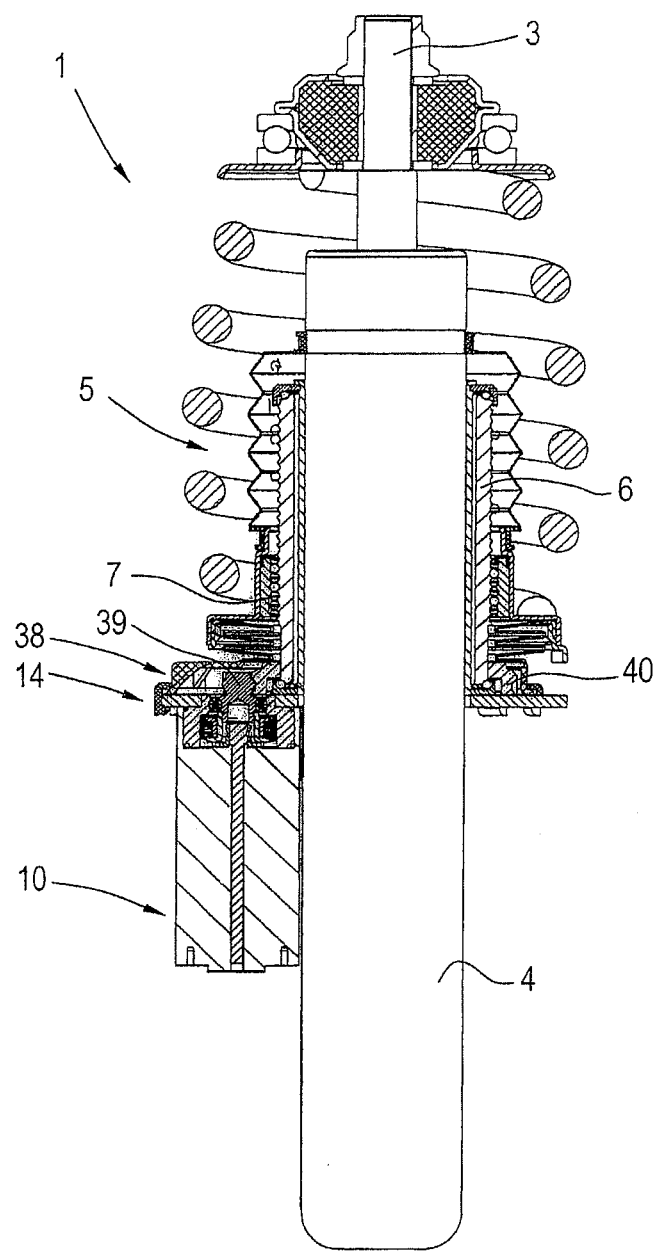
Figure 10:
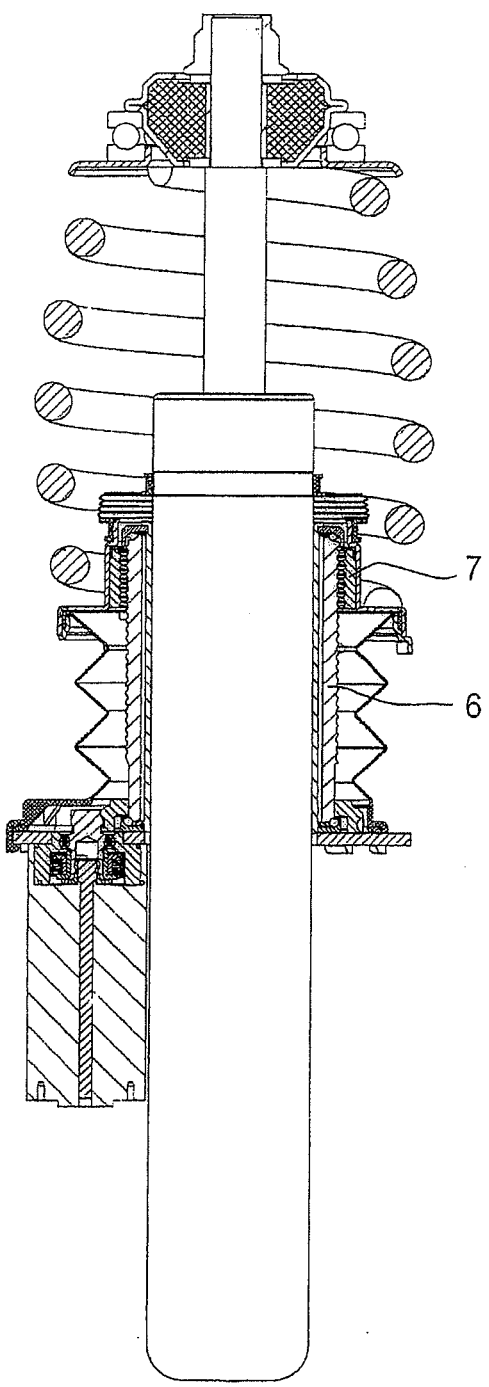

FIGS. 9-12 show another embodiment of a suspension actuator along with the brake unit. The suspension actuator 1 is here constructed as an electromechanical level regulation. It has a first actuator component 3 and a second actuator component 4, wherein the actuator component 3, see FIG. 10, is constructed as a piston rod that can be extended out from the cylinder-like actuator component 4. The actuator component 3 is thus the moving component that is connected to the suspension part to be regulated.

Here, a ball-type screw drive 5 is also provided, comprising a nut 7 and a spindle 6, wherein the fixed spindle 6 viewed in the axial direction is, in this embodiment, the component driven by the drive motor 10, while due to the spindle rotation, the nut 5 is moved in the axial direction along the spindle 6, in order to shift the actuator component 3, here, the rod, in the axial direction, see FIGS. 9 and 10.

Here, a brake unit 14 is also provided, wherein, however, this is not provided like in the construction according to FIG. 1 somewhat axially with respect to the two actuator components 3, 4, but instead offset laterally. It is located in the axial extension to the motor 10 and is coupled with the motor, which will be discussed below. By use of the gear mechanism 38, the motion of the motor 10 is coupled with the spindle 6, for which the gear mechanism 38 has a pinion 39 that meshes with a corresponding teeth section 40 on the spindle 6. Accordingly, in this embodiment, the spindle 6 is the driven part of the ball-type screw drive 5, so the locking is realized here against an externally acting load for preventing an undesired lowering or raising motion by the gear mechanism 38 and the spindle 6, and not, as in the previously described embodiment, by the nut.

Figure 11:
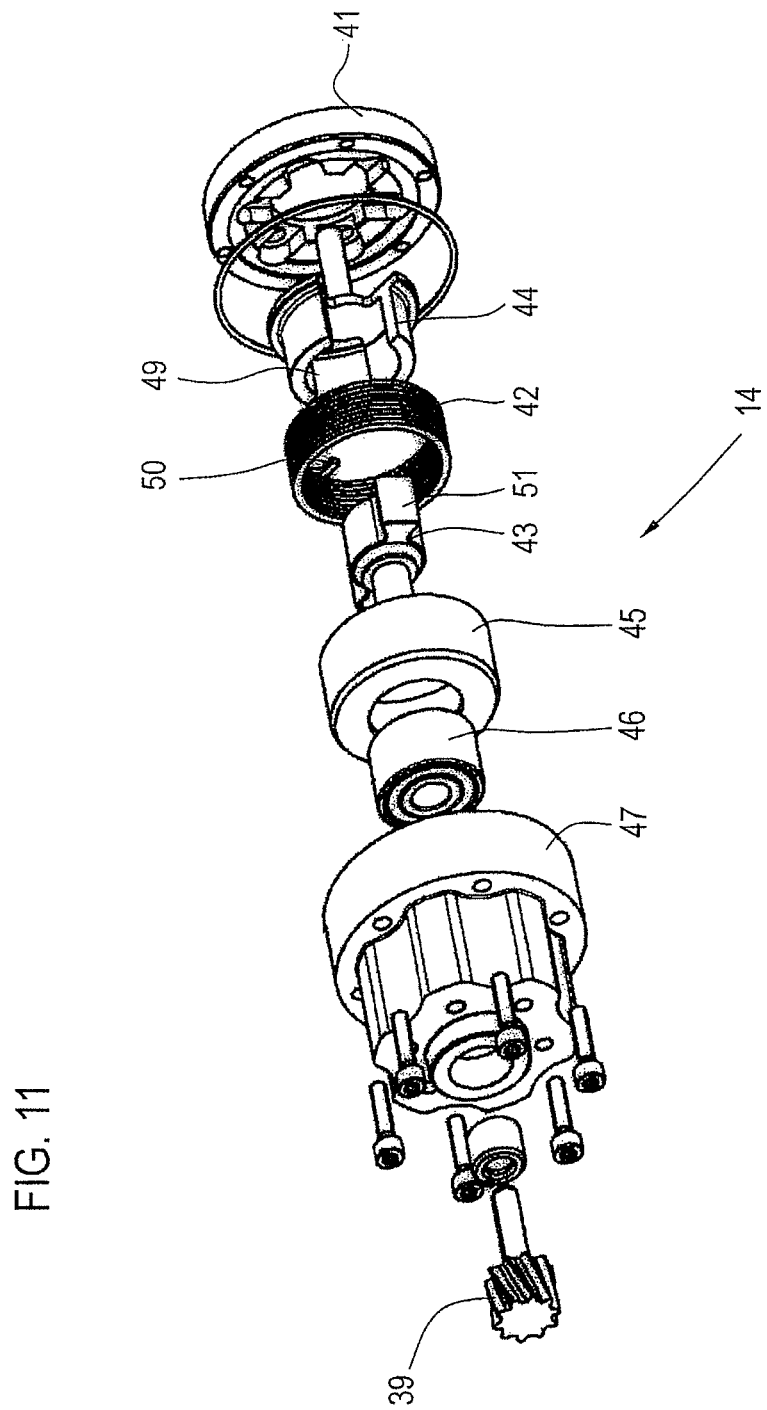
Figure 12:
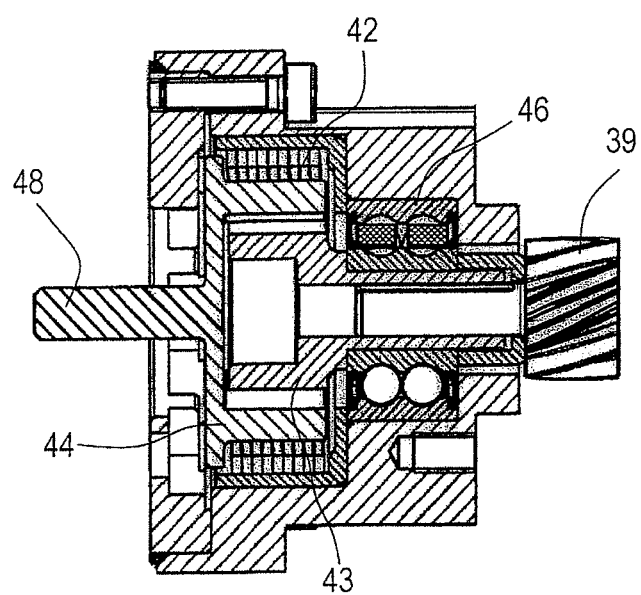

FIGS. 11 and 12 show an enlarged diagram of the brake unit 14. This comprises an adapter plate 41 by which the unit is fastened to the drive motor 10. A helical wrap-spring 42 is also further provided here that also has here spring ends angled inward. It interacts, in turn, with a closer 43 and an opener 44 that, according to the operating situation, retract the helical wrap-spring 42 from its friction contact on the inner side of a sleeve 45, in order to open it, or, in order to close it, bring it into the friction contact. An angular contact ball bearing 46, as well as a housing 47, is further provided on which the already described 39 is arranged on one side.

During operation, if an active adjustment of the level regulation is to be performed, the motor drives the opener 42 by its driven shaft, wherein this opener is connected to the driven shaft by a coupling journal 48. The opener 42 engages on the corresponding spring end 50 by its corresponding catch 49, takes along the helical wrap-spring 42 that takes along on its side, in turn, the closer 43 that is coupled with the gear mechanism 38 with respect to the pinion 39 as part of this gear mechanism, wherein this pinion then meshes with the teeth 40 of the spindle 6, so that this is then rotated in the desired direction defined by the motor rotational direction and consequently the nut 7 is moved in the desired axial adjustment direction.

If an external force is applied by the actuator component, then the spindle rotation is to be locked, which is realized by the gear mechanism 38 or the pinion 39 coupled with the spindle 6 in connection with the brake unit 14 or the helical wrap-spring 42. If a back-rotating force is applied to the spindle 6 due to an external force applied to the nut 7, then this has the result that a rotational movement is given to the closer 43 immediately and directly by the teeth 40 and the pinion 39. This closer now engages with its corresponding catch 51 on the corresponding spring end 50 of the helical wrap-spring and closes this, that is, brings it into a friction-fit, fixed contact with the sleeve 45 that forms the actuator element that is fixed in position and against which it is braked. Through this, a direct locking of the back-rotational movement is realized, according to which any rotational movement of the spindle 6 is blocked by the brake unit 14.

The invention is not limited to the shown constructions. The suspension actuators could instead take on any positioning tasks, that is, they could be used, e.g., for track adjustment, for camber adjustment, or for level regulation.

LIST OF REFERENCE SYMBOLS

1 Suspension actuator
2 Housing
3 Actuator component

4 Actuator component
5 Ball-type screw drive
6 Threaded spindle
7 Nut
8 Ball
9 Bearing
10 Drive motor
11 Toothed belt
12 Belt pulley
13 Belt pulley
14 Brake unit
15 Helical wrap-spring
16 Spring end
17 Spring end
18 Opening element
19 Closing element
20 Catch
21 Catch
22 Actuator element
23 Suspension component
24 Suspension component
25 Wheel bearing
26 Wheel
27 Expansion bellows
28 Brake unit
29 Housing
30 Helical wrap-spring
31 Closing element
32 Opening element
33 Catch
34 Catch
35 Actuator element
36 Spring end
37 Spring end
38 Gear mechanism
39 Pinion
40 Teeth section
41 Adapter plate
42 Helical wrap-spring
43 Closer
44 Opener
45 Sleeve
46 Angular contact ball bearing
47 Housing
48 Coupling journal
49 Catch
50 Spring end
51 Catch

The invention claimed is:

1. Suspension actuator for positioning a movably mounted component of a vehicle suspension, comprising a first actuator component connected to the movably mounted component and a second actuator component connected to a fixed suspension component, wherein both of the actuator components can be adjusted relative to each other in an axial direction by a ball-type screw drive comprising a threaded spindle and a nut running on the threaded spindle, wherein either the nut can be driven by a drive motor for an axial adjustment of the threaded spindle or the spindle can be driven by the drive motor for an axial adjustment of the nut, a brake unit is provided that is activatable by an external, suspension-side force acting on the nut or the spindle and rotating the nut or the spindle and the brake unit builds up a friction moment acting against a nut rotation or a spindle rotation, the brake unit includes a helical wrap-spring having two angled spring ends, with an opening element that can be rotated in either direction by the drive motor for opening the spring wrap and a closing element locked in rotation directly or indirectly with the nut or the spindle for closing the spring wrap connected to the angled spring ends, with the friction moment acting between the nut or the spindle and a first stationary actuator element or between a drive shaft of the drive motor and a second stationary actuator element allocated to the drive motor.

2. The suspension actuator according to claim 1, wherein the helical wrap-spring wraps around the first stationary actuator element which is cylindrical for building up the friction moment and is coupled with the drive motor for loosening the spring wrap and with the nut or the spindle for closing the spring wrap.

3. The suspension actuator according to claim 2, wherein the opening element and the closing element each have two circular-arc-shaped catches arranged opposite each other, the catches of both of the opening and closing elements engage in each other with a peripheral spacing, and the two angled spring ends are each positioned between two of the catches.

4. The suspension actuator according to claim 2, wherein the spring ends are angled radially inwardly or outwardly.

5. The suspension actuator according to claim 2, wherein the first stationary actuator element is wrapped around by the helical wrap-spring on an outer face or an inner face thereof.

6. The suspension actuator according to claim 1, wherein the drive motor is arranged laterally on a housing of the suspension actuator and is coupled with the nut or the spindle by a traction mechanism or by a gear mechanism.

* * * * *